United States Patent
Arefjord

(10) Patent No.: US 8,585,893 B2
(45) Date of Patent: Nov. 19, 2013

(54) PARTICLE COLLECTOR WITH WEIGHT MEASURING

(75) Inventor: Anders Mathias Arefjord, Os (NO)

(73) Assignee: AGR Subsea AS, Straume (NO)

( * ) Notice: Subject to any disclaimer, the term of this patent is extended or adjusted under 35 U.S.C. 154(b) by 860 days.

(21) Appl. No.: 12/451,438

(22) PCT Filed: May 9, 2008

(86) PCT No.: PCT/NO2008/000163
§ 371 (c)(1),
(2), (4) Date: Apr. 13, 2010

(87) PCT Pub. No.: WO2008/140322
PCT Pub. Date: Nov. 20, 2008

(65) Prior Publication Data
US 2010/0193414 A1    Aug. 5, 2010

(30) Foreign Application Priority Data
May 9, 2007   (NO) .................................. 2007 2398

(51) Int. Cl.
*B01D 21/26*       (2006.01)
(52) U.S. Cl.
USPC ...... 210/113; 210/304; 210/312; 210/170.11; 210/512.3; 166/75.12
(58) Field of Classification Search
USPC ............. 166/75.12, 267; 210/170.01, 170.11, 210/304, 512.1, 512.3, 312, 313, 85, 86, 210/113
See application file for complete search history.

(56) References Cited

U.S. PATENT DOCUMENTS 5,853,597 A * 12/1998 Yoshioka et al. ............. 210/712
6,119,779 A * 9/2000 Gipson et al. ................ 166/267

FOREIGN PATENT DOCUMENTS

GB        2342057 A  *  4/2000
NO         313580 B1  * 10/2002
WO   WO 2004003335 A2 *  1/2004

* cited by examiner

*Primary Examiner* — Terry Cecil
(74) *Attorney, Agent, or Firm* — Abelman, Frayne & Schawb

(57) ABSTRACT

A particle collector for a dynamic cyclone placed on the ocean bottom for separation of particles in a fluid is described, where the dynamic cyclone comprises a tank (2) which is equipped with an upper inlet opening (25) and an upper and lower outlet opening (26, 32) for outflow of fluid and particles, respectively. Furthermore, the tank comprises a shaft (5) which is equipped with a number of vanes or blades (6) and which is arranged to be driven by an adjoining motor (1), where a centrally placed piece of pipe (4) with a number of slits is arranged around the shaft (5). A pressure tank (12) for particle collection is arranged downstream of the lower outlet opening (32) of the cyclone, via an inlet (18), as the pressure tank (12) comprises a collector (13) with at least a partially open top, where the collector (13) rests in a liquid bath and on a weight meter (15) in the tank (12), and also an ejector (14) which is arranged to supply liquid via an inlet (8) and to send out a fluid mixture from the collector (13) via an outlet (16).

20 Claims, 5 Drawing Sheets

PARTICLE COLLECTOR WITH WEIGHT MEASURING

FIELD OF THE INVENTION

The present invention relates to a particle collector for a dynamic cyclone placed on the ocean bottom for separation of particles in a fluid, where the dynamic cyclone comprises a tank which is equipped with an upper inlet opening and an upper and a lower outlet opening for outlet of fluids and particles, respectively, the tank further comprises a shaft which is equipped with a number of vanes or blades and which is arranged to be driven by an adjoining motor, where a centrally placed pipe piece with a number of slits is placed around the shaft and that a pressure tank for particle collection is arranged downstream of the lower outlet opening of the cyclone via an inlet. The invention also relates to systems for separation of sand particles with the help of the particle collector.

STATE OF THE ART

In production of oil/gas on platforms, sand particles will often occur in the well stream. Much of the sand is settled in large production tanks (separators). Previously, it has been necessary to stop production and open the separators to remove the sand manually. To remove the sand during production, separators are jetted with the help of nozzles that push the sand towards a drain pipe and send it on to a sand cyclone. A dynamic de-sander (cyclone) has been used on several platforms for jetting of the separators. By connecting the cyclone in a loop with the separator, it can separate out the sand and deliver clean water back to the separator. This can be carried out under high pressure without stopping the production of oil/gas. As the separators can also be placed on the ocean bottom, this system will be suitable for subsea removal of sand.

At the start up of a new oil well, there will be remains of drilling mud, well borings and particles which must be removed before the well is put into oil production and gas production. By connecting the cyclone between the wellhead and processing installation, the cyclone can remove unwanted particles from a well stream before the stream goes further in the processing installation. This will reduce wear on downstream piping, pumps, valves, equipment, etc. This technology can also be used when the wellhead stands on the ocean bottom (satellite well). By preparing the cyclone for underwater operations, this will open for a new market for subsea testing of wells.

OBJECTS OF THE INVENTION

Consequently, it is an object of the present invention to provide a solution where the disadvantages described above are avoided, and in which an improved collection and handling of said particles are provided.

A dynamic particle separator is known from Norwegian patent NO 313580, and relates to a particle separator or cyclone in two steps for application in separation of particles from a flow of liquid, gas or both. The particle separator can be especially used for, for example, separation of sand particles from oil and gas in oil production pipes, separation of particles in the processing industry or separation of particles in, for example, a water supply. The separation of particles takes place in two steps, in that the largest particles in a number of cases first follow the inner wall of a container and fall out of this, whilst in a step two, one circulates the gas flow or liquid flow through a motorised vane system together with the particles outside and inside in a built-in pipe casing with slits, something which leads to fine particles being actively driven out to the edge of the container by centrifugal force because of a larger mass density than the fluid. Thereafter, they will fall down towards the bottom of the container due to gravitational forces, where they are led out of or to another underlying tank for particle collection or to a drainage system, at the same time as the liquid is continuously led out through an outlet pipe connected to the top of the upper pressure tank.

From other prior art WO 2004/003335 A2, GB 2342057 A and U.S. Pat. No. 5,853,597 shall be mentioned. WO 2004/003335 A2 shows an underwater system with a hydro-cyclone, in contrast to a dynamic cyclone which is used in the present invention, for separation of sand from seawater and a sand storage tank for collection of sand which is separated from the seawater. In WO 2004/003335 A2 there is no tank with an open collector that rests in a liquid bath and on a weight meter, as described in the present application.

The tank according to the invention comprises an ejector for supply of liquid and emission of a fluid mixture with particles. This is not known from GB 234057 A. According to U.S. Pat. No. 5,853,597, the pressure tank is not placed downstream of a cyclone.

For oil companies, separation of particles, for example, during oil production leads to large costs and a considerable effort because sand particles cause damage to the equipment through which the oil is pumped. Particles lead to, among other things, erosion of pipe systems with resulting safety risks and also clogging of filters. So far, equipment that is used for separation has been dependent on particle size and the speed of the flow of the liquid and/or gas they can be found in.

SUMMARY OF THE INVENTION

The above mentioned objects are achieved with a particle collector as set forth in the appended claims, in that the pressure tank comprises a collector with at least a partially open top, where the collector rests in a liquid bath and on a weight meter in the tank, and also an ejector which is arranged to supply liquid via an inlet and to send out a liquid mixture with particles from the collector via an outlet.

Alternative preferred embodiments are set forth in the appended claims, in that the collector is preferably formed as a bucket with an outer form corresponding to the inner form of the tank, albeit with a smaller diameter and length. The weight meter can be arranged in an area at the bottom of the tank so that the collector rests on the weight meter.

A filter, such as a membrane filter, can be arranged between the top of the bucket and the pressure tank, arranged to prevent that particles separate out in the liquid bath between the bucket and the tank. Furthermore, a signal processor can be connected to the weight meter, arranged to control the ejector.

Said object is also achieved with a system as set forth in the appended claims.

A system for separation of sand particles from a separator according to the invention, where the separator is placed on the ocean bottom and is arranged to receive sand particles from a well, preferably comprising a separator which is connected in a loop to a dynamic cyclone with a particle collector, as described above, as flushing water with sand particles from the separator is arranged to be added to the inlet of the cyclone, and that cleaned flushing water is led back to the separator while sand particles are caught in the particle collector.

A system for separation of sand particles from a well stream from a wellhead according to the invention, is characterised in that a flow for the well stream is connected to an inlet of a dynamic cyclone with a particle collector, as described above, as the sand particles from the well stream are caught in the particle collector while the return liquid or gas is sent to a pipeline or to a separator.

Alternative preferred embodiments of the system are set forth in the appended claims, in that sand particles, which accumulate in said particle collector when the collecting bucket is full, are sent to an external collecting tank with the help of the ejector.

BRIEF DESCRIPTION OF THE DRAWINGS

The invention shall now be described in more detail with help of the enclosed figure, in which.

DETAILED DESCRIPTION OF THE INVENTION

Figure 1:
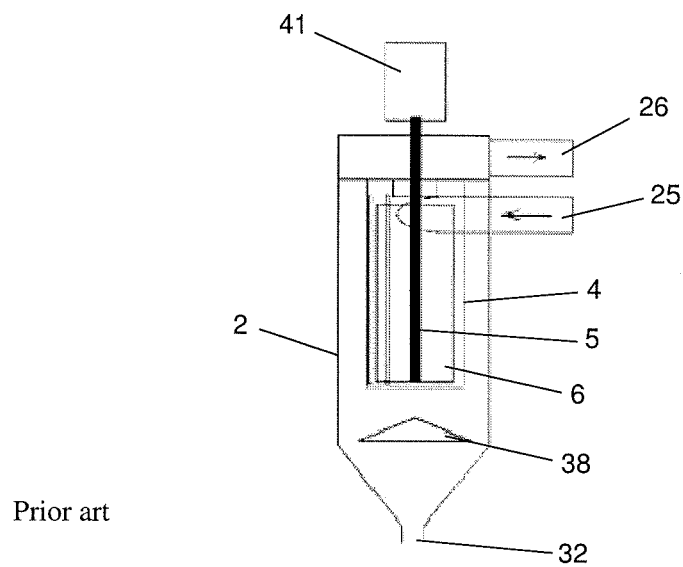
FIGS. 1 and 2 show a known dynamic cyclone.
Figure 2:
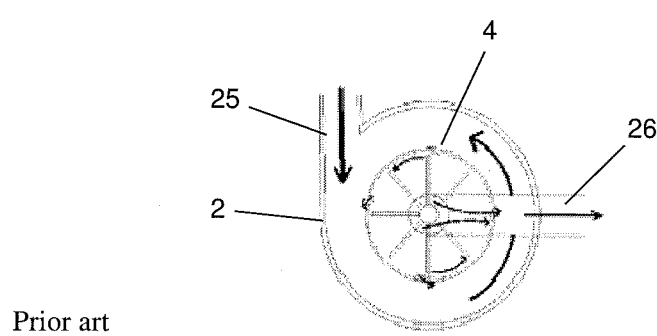
Figure 3:
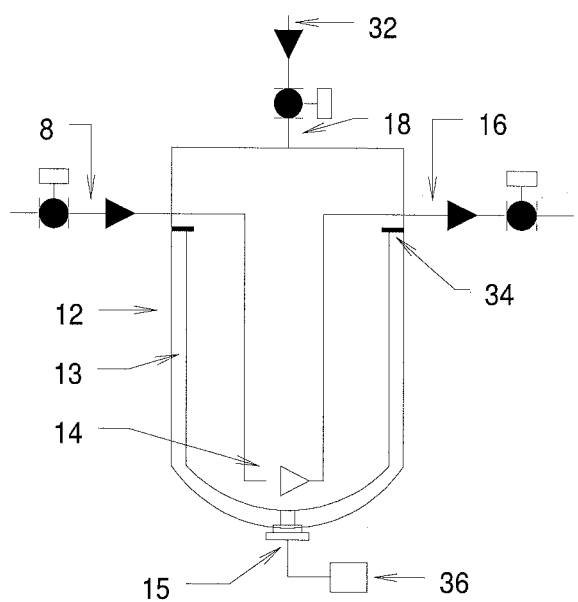
FIG. 3 shows a particle collector according to the invention.

A known cyclone as described in the aforementioned NO 313580 is shown in the FIGS. 1 and 2. The flow of particles together with liquid and/or gas is led in through an inlet pipe 25 to a tank 2 with a lid 3. An inner pipe casing 4 with longitudinally running slits is fitted in the tank. In the middle of this rotates a shaft 5 with a varying number of rotor blades 6. The rotation of the shaft is driven by an unspecified motor 41, which can be electric, pneumatic or hydraulic. The hydraulic, pneumatic or electric motor 41 can be built into the top lid 3 or in the tank 2 in a way not specified here, or be fitted outside the lid 3. The lid 3 is fastened, in a way not specified here, to the top of the tank 2 which contains the inner pipe casing 4. The largest particles in the flowing medium will, because of the flow velocity, in most cases follow the outer wall of the tank 2 and through gravitational forces fall out through the outlet pipe 32. In some cases, a passive first step will thereby lead to particle separation of larger particles. Finer, lighter particles will mix with the liquid and gas in the tank 2, inside and outside the pipe casing 4. Because of the circulation of the medium which arises through the rotation of the blades 6, finer particles will also be driven out towards the edges through the pipe casing 4 which, in a second separation step, amplifies the centrifugal force and drives the particles out through the slits. A cone-formed gas-barrier 38 prevents gas in the middle of the tank 2 penetrating into the outlet pipe 32.

Liquid and gas are taken out through an opening in the lid 3 of the tank because of the pressure, and are led out through the outlet pipe 26. This is because they are the elements with lowest mass density in the streaming medium, and because the tank 2 is continuously supplied with new liquid, gas and particles.

Figure 4:
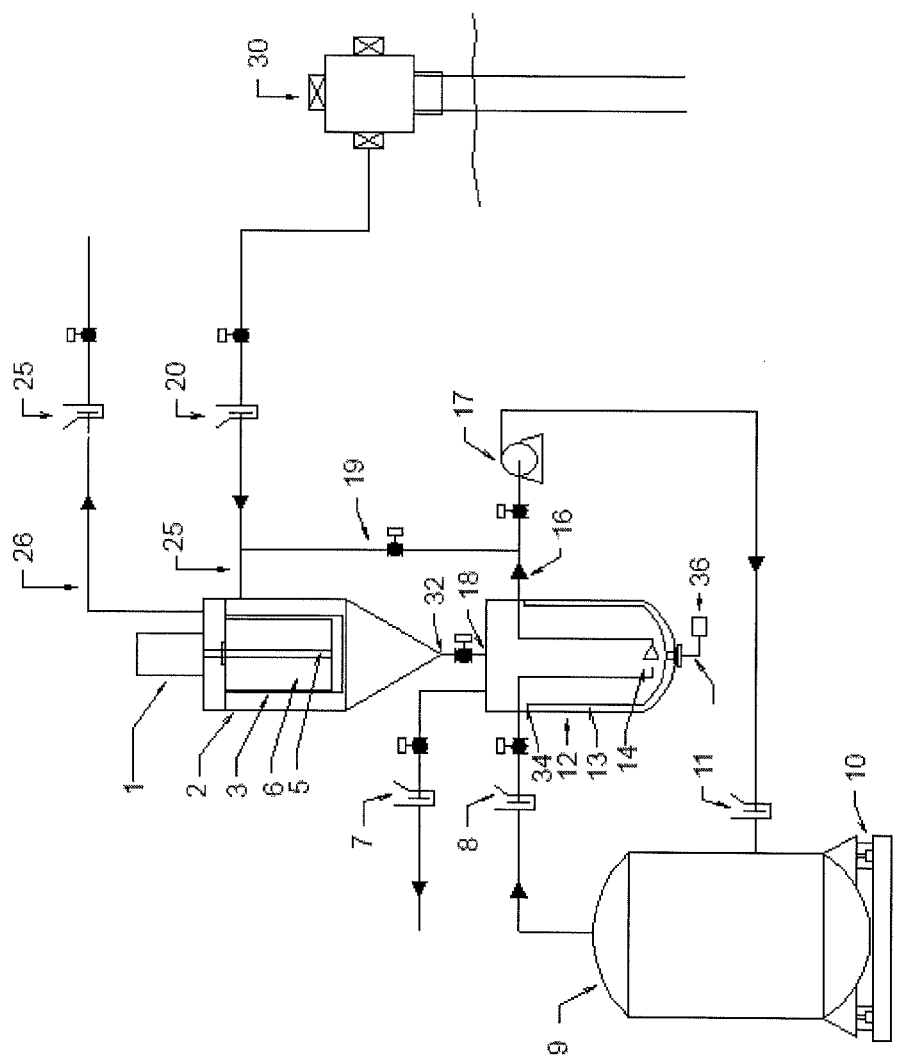
FIG. 4 shows a system according to the invention, where the dynamic cyclone and the particle collector are connected between the wellhead and a storage tank for sand.

A dynamic cyclone 2 as described above, with a particle collector 12, can be placed on the ocean bottom connected to a wellhead 30 (as shown in FIG. 4). The well stream from the wellhead is led via an inlet 20 to the inlet 25 and through the cyclone 2, and is cleaned for particles. The well stream can be led further to the well manifold. In the collector 12, particles are preferably accumulated in a collector 13, in the form of, for example, a weight bucket, with, for example, a weight cell 15 that provides control of how much particles that is taken out of the well stream. Furthermore, a signal processor 36 can be connected to the weight meter 15 to control the ejector 14. When the particle collector 12 is full, a valve between the cyclone and the collector 12 will be closed to isolate the pressure from the well stream. A pressure relief line 7 is opened to drain pressure to the ocean bottom atmosphere. The ejector 14 gets drive water from a line 8 that sucks out particles with, for example, 50% fluid and empties the weight bucket to send particles further to, for example, a larger storage tank 9. As shown in the figure, this larger storage tank 9 can be placed near or at a distance from the particle collector 12. A circulating pump 17 drives the loop 11, 8, 16 to transport particles/liquid. One or more weight cells 10 can be arranged on the storage tank 9 to control the amount of particles in the storage tank 9.

The cyclone packet with the pump can be arranged on its own skid which is placed on a subsea template via guide wires from a surface vessel. This ensures that the cyclone packet can be installed/demobilised for temporary operations. The storage tank has the same system for transport of particles to surface vessels. And longer operations can lead to changing storage tanks, while the cyclone packet remains standing on the ocean bottom.

The particle collector 12 for liquid/particle collection receives particle separation from the dynamic cyclone 2 preferably via an inlet 18 on the top. The collector 13 can, as mentioned, be in the form of a bucket with an open top and which has a smaller diameter and length than the collector and is fitted in the bottom of the tank. The particle collector 12 can be in the form of a pressure tank. Furthermore, it can be filled with liquid between pressure tank and weight bucket and alternatively a membrane filter 34 can be arranged at the top to ensure that particles are not separated out in this intermediate space. The bucket is fitted at the bottom of the pressure tank on a weight cell 15 of an electric or hydraulic type. The weight cell 15 informs about the amount of particles collected in the weight bucket with different specific gravity of particles and fluid.

The ejector 14 can be driven by a pressure fluid from the line 8 and which mixes and draws particles from the weight bucket with a mixture of, for example, 50/50% particles/fluid with it. The particle/fluid mixture is sent out through the outlet 16.

A levelling pipe 19 can be arranged between the inlet 25 of the cyclone 2 and the particle outlet 16 on the particle collector 12. Furthermore, an inlet 21 for jetting from the separator 28 can be connected to the inlet 25 of the cyclone.

Figure 5:
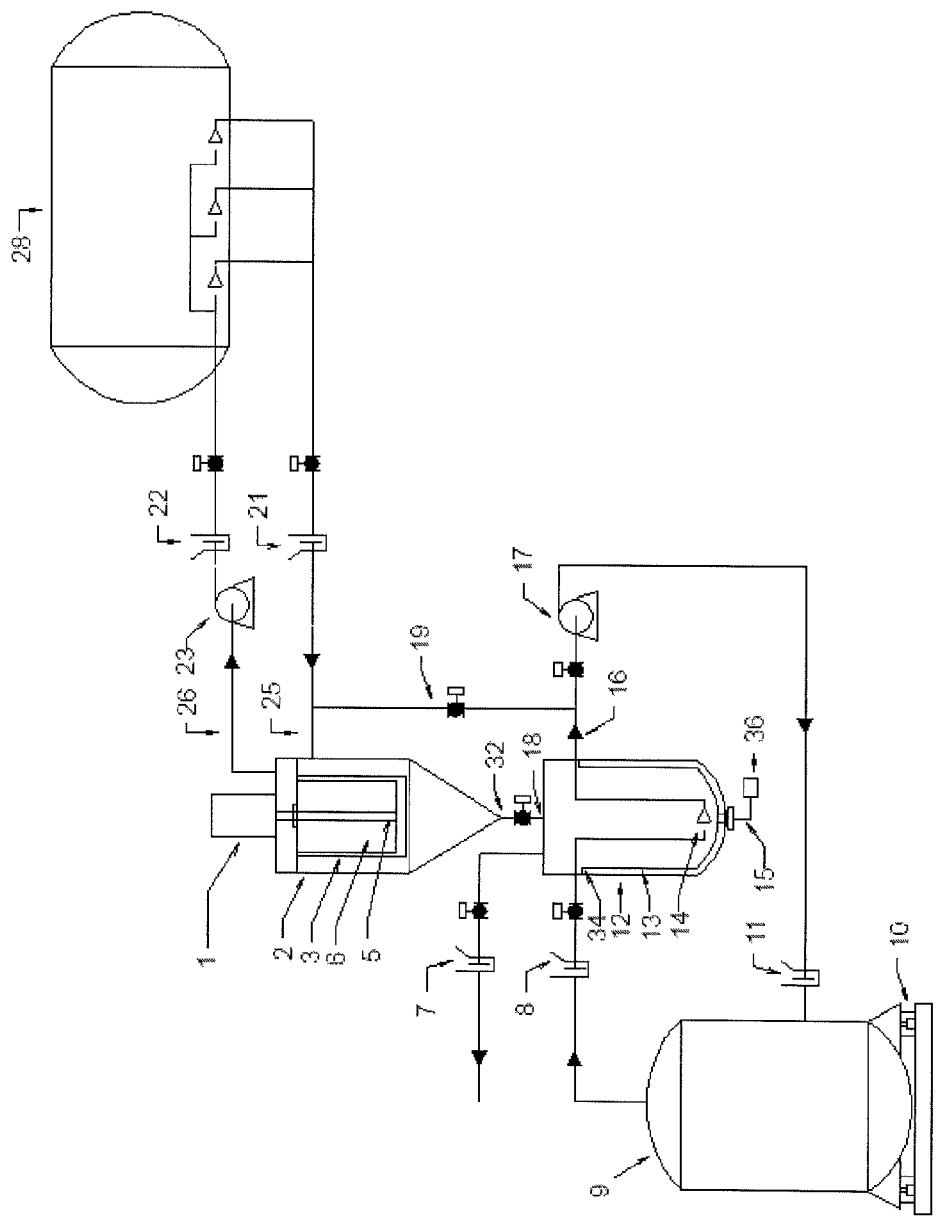
FIG. 5 shows a system as shown in FIG. 4, where a separator for sand is also incorporated.
Figure 6:
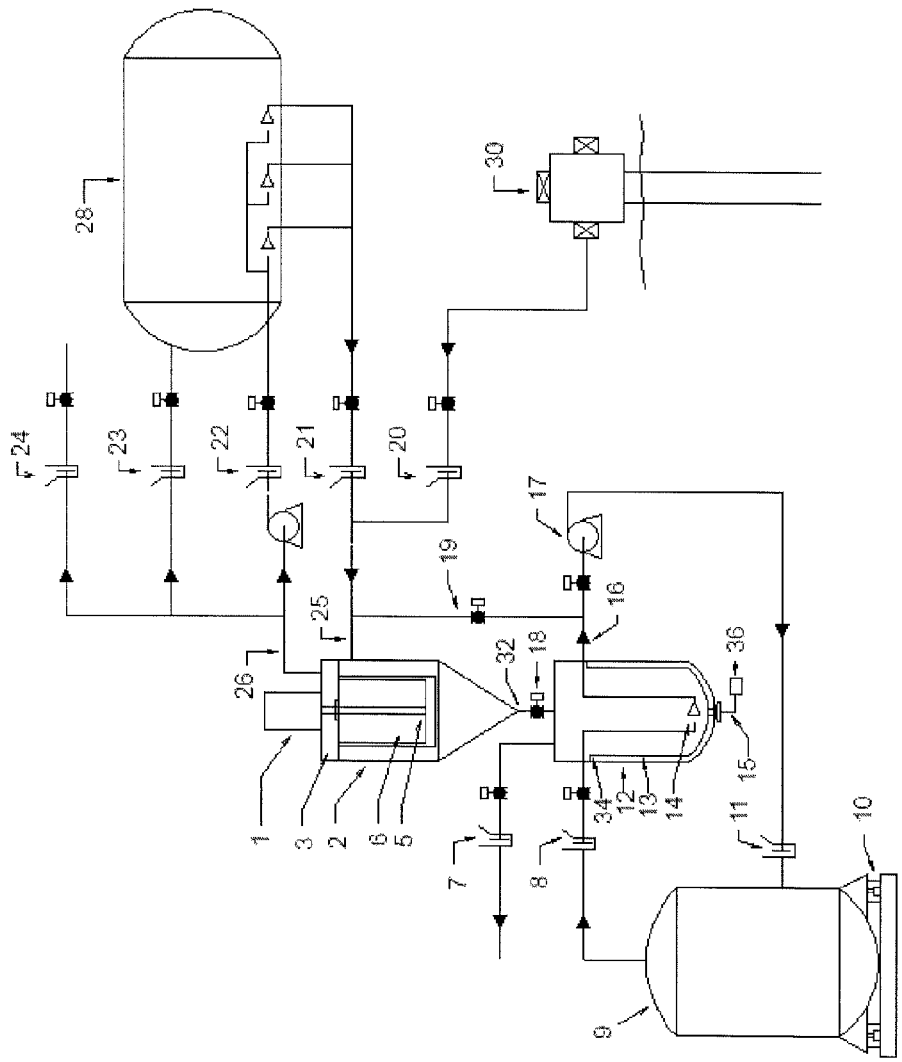
FIG. 6 shows a combination of the solutions shown in the FIGS. 4 and 5.

FIGS. 5 and 6 show a system for separation of sand particles from a separator 28 where the separator is placed on the ocean bottom and arranged to receive sand particles from a well 30. As can be seen, the separator 28 is connected to the dynamic cyclone 2 with the particle collector 12 in a loop. Flushing water with sand particles from the separator 28 is added to the inlet 25 of the cyclone and cleaned flushing water is returned to the separator 28 while sand particles are caught in the particle collector 12.

FIG. 4 shows a system for separation of sand particles from a well stream from a wellhead 30, where a flow 20 for the well stream is connected to the inlet 25 of the dynamic cyclone 2 with the particle collector 12. Sand particles from the well stream are caught in the particle collector 12 while return liquid or return gas are sent via a pipeline 22, 23 to the separator 28 or via an external pipeline 24.

The invention claimed is:

1. A particle collector for a dynamic cyclone placed on the ocean bottom for separation of particles in a fluid, where the dynamic cyclone comprises a tank which is equipped with an upper inlet opening and an upper and a lower outlet opening for outflow of liquid and particles, respectively, the tank comprises a shaft which is equipped with a number of vanes or blades and which is arranged to be driven by an adjoining motor, where a centrally placed pipe piece with a number of slits is arranged around the shaft, and a pressure tank for particle collection is arranged downstream of the lower outlet opening of the cyclone via an inlet, wherein the pressure tank comprises a collector with at least a partially open top, where the collector rests in a liquid bath and on a weight meter in the tank, and also an ejector which is arranged to supply liquid via an inlet and to send out a fluid mixture with particles from the collector via an outlet.

2. The particle collector according to claim 1, wherein the collector is shaped as a bucket with an outer form corresponding to an inner form of the tank, but with a smaller diameter and length.

3. The particle collector according to claim 2, wherein a filter, such as a membrane filter, is arranged between the top of the bucket and the pressure tank, to prevent particles from being separated out in the liquid bath between the bucket and the tank.

4. The particle collector according to claim 3, wherein a signal processor is connected to the weight meter, arranged to control the ejector.

5. A system for separation of sand particles from a separator, where the separator is placed on the ocean bottom and arranged to receive sand particles from a well, wherein the separator is connected to a dynamic cyclone, in a loop, with a particle collector, according to claim 3, as flushing water with sand particles from the separator is arranged to be added to the inlet of the cyclone and that clean flushing water is returned to the separator, while sand particles are caught in the particle collector.

6. A system for separation of sand particles from a well stream from a wellhead, wherein a flow for the well stream is connected to an inlet of a dynamic cyclone with a particle collector, according to claim 3, as the sand particles from the well stream are caught in the particle collector while return liquid or return gas are sent to an external pipeline or to a separator.

7. The particle collector according to claim 2 wherein weight meter is arranged in a bottom area of the tank so that the collector rests on the weight meter.

8. A system for separation of sand particles from a separator, where the separator is placed on the ocean bottom and arranged to receive sand particles from a well, wherein the separator is connected to a dynamic cyclone, in a loop, with a particle collector, according to claim 2, as flushing water with sand particles from the separator is arranged to be added to the inlet of the cyclone and that clean flushing water is returned to the separator, while sand particles are caught in the particle collector.

9. A system for separation of sand particles from a well stream from a wellhead, wherein a flow for the well stream is connected to an inlet of a dynamic cyclone with a particle collector, according to claim 2, as the sand particles from the well stream are caught in the particle collector while return liquid or return gas are sent to an external pipeline or to a separator.

10. The particle collector according to claim 1 wherein the weight meter is arranged in a bottom area of the tank so that the collector rests on the weight meter.

11. The particle collector according to claim 10 wherein a filter, such as a membrane filter, is arranged between the top of the bucket and the pressure tank, to prevent particles from being separated out in the liquid bath between the bucket and the tank.

12. The particle collector according to claim 10, wherein a signal processor is connected to the weight meter, arranged to control the ejector.

13. A system for separation of sand particles from a separator, where the separator is placed on the ocean bottom and arranged to receive sand particles from a well, wherein the separator is connected to a dynamic cyclone, in a loop, with a particle collector, according to claim 10, as flushing water with sand particles from the separator is arranged to be added to the inlet of the cyclone and that clean flushing water is returned to the separator, while sand particles are caught in the particle collector.

14. A system for separation of sand particles from a well stream from a wellhead, wherein a flow for the well stream is connected to an inlet of a dynamic cyclone with a particle collector, according to claim 10, as the sand particles from the well stream are caught in the particle collector while return liquid or return gas are sent to an external pipeline or to a separator.

15. The particle collector according to claim 1, wherein a signal processor is connected to the weight meter, arranged to control the ejector.

16. A system for separation of sand particles from a separator, where the separator is placed on the ocean bottom and arranged to receive sand particles from a well, wherein the separator is connected to a dynamic cyclone, in a loop, with a particle collector, according to claim 15, as flushing water with sand particles from the separator is arranged to be added to the inlet of the cyclone and that clean flushing water is returned to the separator, while sand particles are caught in the particle collector.

17. A system for separation of sand particles from a separator, where the separator is placed on the ocean bottom and arranged to receive sand particles from a well, wherein the separator is connected to a dynamic cyclone, in a loop, with a particle collector, according to claim 1, as flushing water with sand particles from the separator is arranged to be added to the inlet of the cyclone and that clean flushing water is returned to the separator, while sand particles are caught in the particle collector.

18. The system according to claim 17, wherein sand particles that accumulate in said particle collector, when a collector bucket is full, are sent to an external storage tank with the help of the ejector.

19. A system for separation of sand particles from a well stream from a wellhead, wherein a flow for the well stream is connected to an inlet of a dynamic cyclone with a particle collector, according to claim 1, as the sand particles from the well stream are caught in the particle collector while return liquid or return gas are sent to an external pipeline or to a separator.

20. The system according to claim 19, wherein sand particles that accumulate in said particle collector, when a collector bucket is full, are sent to an external storage tank with the help of the ejector.

* * * * *